US007663481B2

(12) United States Patent
Kim et al.

(10) Patent No.: US 7,663,481 B2
(45) Date of Patent: Feb. 16, 2010

(54) METHOD FOR SENSOR NODE ROAMING IN WIRELESS SENSOR NETWORK ENVIRONMENT

(75) Inventors: Kyu Hyung Kim, Daejeon (KR); Kee Koo Kwon, Daegu (KR); Gwang Su Kim, Daejeon (KR); Jang Sik Bae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 315 days.

(21) Appl. No.: 11/928,485

(22) Filed: Oct. 30, 2007

(65) Prior Publication Data

US 2008/0129494 A1 Jun. 5, 2008

(30) Foreign Application Priority Data

Dec. 5, 2006 (KR) ........................ 10-2006-0122650
Jul. 13, 2007 (KR) ........................ 10-2007-0070337

(51) Int. Cl.
*G08B 1/08* (2006.01)
(52) U.S. Cl. .................. 340/539.22; 340/539.1; 340/539.11; 340/531; 340/825.69; 340/825.72; 370/328; 370/331
(58) Field of Classification Search ............ 340/539.22, 340/539.1, 539.11, 522, 531, 825.69, 825.72; 370/328, 331, 341, 453; 455/404.1, 414.3, 455/426.1
See application file for complete search history.

(56) References Cited

U.S. PATENT DOCUMENTS 6,661,782 B1 * 12/2003 Mustajarvi et al. ......... 370/331

7,119,676 B1 * 10/2006 Silverstrim et al. ......... 340/531
7,142,847 B2 * 11/2006 Umeda et al. ............... 455/418
7,164,912 B2 * 1/2007 Buckley et al. .......... 455/435.2
2006/0154642 A1 7/2006 Scannell
2006/0223569 A1 10/2006 Collmeyer et al.

FOREIGN PATENT DOCUMENTS

| KR | 1020020006474 A | 1/2002 |
|---|---|---|
| KR | 10-2006-0050947 | 5/2006 |
| KR | 10-2006-0058316 | 5/2006 |
| KR | 1020060067729 A | 6/2006 |
| KR | 10-2006-0074315 | 7/2006 |

OTHER PUBLICATIONS

Lee et al., "Task Scheduling Technique for Energy Efficiency in Wireless Sensor Networks", Journal of Korea Information and Communications Society, vol. 31, No. 9A, pp. 884-891.

* cited by examiner

*Primary Examiner*—Hung T. Nguyen
(74) *Attorney, Agent, or Firm*—Rabin and Berdo, P.C.

(57) ABSTRACT

Provided is a method for mobile sensor node roaming in an environment of first and second adjacent wireless sensor networks having a plurality of sensor nodes. The method includes the steps of: periodically performing energy detection scan and active scan operations, at the mobile sensor node forming an association with a parent node of the first wireless network, and obtaining energy values of selected channels and link quality indications (LQIs) for the channels; when the sensor node moves to the second wireless sensor network, periodically performing energy detection scan and active scan operations, at the sensor node, and obtaining energy values of selected channels and link quality indications (LQIs) for the channels after movement; comparing, at the sensor node, the energy values and link quality indications (LQIs) of the selected channels before and after movement.

9 Claims, 5 Drawing Sheets

FIG. 5

| Channel numbers n | Energy scan value | PAN ID 1 | LQI |
|---|---|---|---|
| Channel numbers n | Energy scan value | PAN ID 2 | LQI |

⋮

| Channel numbers n | Energy scan value | PAN ID m | LQI |

$0<n<26$

METHOD FOR SENSOR NODE ROAMING IN WIRELESS SENSOR NETWORK ENVIRONMENT

CROSS-REFERENCE TO RELATED APPLICATION

This application claims priority to and the benefit of Korean Patent Application No. 2006-122650, filed Dec. 5, 2006, and No. 2007-70337, filed Jul. 13, 2007, the disclosure of which is incorporated herein by reference in its entirety.

BACKGROUND

1. Field of the Invention

The present invention relates to a method for sensor node roaming in a wireless sensor network environment, and more specifically, to a method for effective sensor node roaming between adjacent wireless sensor networks.

2. Discussion of Related Art

Generally, a wireless sensor network or a ubiquitous sensor network is a network of a plurality of sensors arranged to wirelessly collect and process various data sensed by the sensors to thereby transmit the sensed data to a manager Compared to a general wireless mobile communication network, such a wireless sensor network has self-organizing ability, features of short range broadcast communication and multi-hop routing, densely deployed sensor nodes, cooperating sensor nodes, suddenly changing topology due to radio fading and sensor node failure, and limitations in energy consumption, transmission output, memory, and computing ability due to microminiaturized sensor node structure.

FIG. 1 is a conceptual diagram showing the configuration of a general wireless sensor network.

Referring to FIG. 1, a general wireless sensor network (WSN) is a kind of ad-hoc network composed of sensor nodes SN1 to SN5 (for example, ZigBee) and a sink node for particular purposes. In order to provide collected information to a user, the WSN employs a legacy network including an IP-based network (BcN). Thus, the collected information should be passed through a gateway.

Also, an application server (AS) is needed to provide various wireless sensor network-based application services. Each sensor node SN1 to SN5 has a sensing function for sensing peripheral information, a transmission function for transmitting it to another sensor node, and a reception function for receiving information transmitted from other sensor nodes.

Furthermore, although not illustrated in FIG. 1, there is a gateway for connecting existing wired and wireless telephone networks with the IP-based network.

FIG. 2 is a diagram showing movement of the sensor node of FIG. 1 from a current wireless sensor network to a neighboring wireless sensor network, and FIG. 3 is a flowchart showing the sensor node movement of FIG. 2.

Referring to FIG. 2, in the case where the sensor node SN1 with mobility in the existing wireless sensor network WSN1 moves to a neighboring wireless sensor network WSN2, the sensor node SN1 forms an association with its parent node in a medium access control (MAC) layer so that even though it moves to the neighboring wireless sensor network WSN2, it cannot perform communication in the wireless sensor network WSN2.

When the sensor node SN1 moves to the neighboring wireless sensor network WSN2 and then moves back to WSN1, it can again perform communication in WSN1.

In other words, a sensor node in a particular wireless sensor network can perform communication only in the particular wireless sensor network. If it moves to a neighboring wireless sensor network, it cannot perform communication there.

Referring to FIG. 3, the mobile sensor node SN1 in the wireless sensor network WSN1 should form an association with its parent node PN1 in order to transmit data in the wireless sensor network WSN1. In order to judge if there is a certain node where the sensor node is positioned before forming such an association, a routine is needed for judging if there are certain nodes in the vicinity and if the sensor node should form an association with a certain node, through an active scan or a passive scan. Through such a process, an environment enabling the sensor node N1 to perform data communication in the wireless sensor network WSN1 is provided.

When the sensor node SN1 does not perform data communication with its parent node PN1 or other sensor nodes SN2 to SN5 in its wireless sensor network WSN1, but moves to neighboring wireless sensor network WSN2, it cannot perform communication if it is out of radio frequency communication range from its parent node PN1 and the sensor nodes SN2 to SN5 in the wireless sensor network WSN1. Consequently, it is unknown whether there is the sensor node SN1 in a certain place and a certain network.

SUMMARY OF THE INVENTION

The present invention is directed to a method for sensor node roaming in a wireless sensor network environment which enables the development of various wireless sensor network-based application services by performing effective sensor node roaming between adjacent wireless sensor networks.

One aspect of the present invention provides a method for mobile sensor node roaming in an environment of first and second adjacent wireless sensor networks having a plurality of sensor nodes, the method comprising the steps of: (a) periodically performing energy detection scan and active scan operations, at the mobile sensor node forming an association with a parent node of the first wireless network, and obtaining energy values of selected channels and link quality indications (LQIs) for the channels; (b) when the sensor node moves to the second wireless sensor network, periodically performing energy detection scan and active scan operations, at the sensor node, and obtaining energy values of selected channels and link quality indications (LQIs) for the channels after movement; (c) comparing, at the sensor node, the energy values and link quality indications (LQIs) of the selected channels before and after movement; (d) when the selected channel energy values and link quality indications (LQIs) are larger after movement than before movement, forming, at the sensor node, an association with a parent node of the second wireless sensor network; and (e) breaking off, at the sensor node, the association with the parent node of the first wireless sensor network.

In steps (a) and (b), the energy values and link quality indications (LQIs) for each channel may be managed in a table.

The table may further comprise energy scan values for each channel and IDs of personal area network (PAN) nodes in each channel.

The link quality indications (LQIs) for each channel may be obtained from a received signal strength indication (RSSI) value, a signal to noise ratio (SNR), and an energy scan value.

In step (d), the sensor node may provide information about the first wireless sensor network, in which it has already formed an association, to the parent node of the second wireless sensor network.

In step (e), the sensor node may provide the information about the second wireless sensor network, to which it moved, to the parent node of the first wireless sensor network.

Another aspect of the present invention provides a method for mobile sensor node roaming in an environment of a plurality of adjacent wireless sensor networks having a plurality of sensor nodes, the method comprising the steps of: (a') forming, at the sensor node, an association with a parent node of a wireless sensor network in which the sensor node is currently positioned through a periodic active scan operation; (b') selecting, at the sensor node, currently used channels by detecting energy values through a periodic energy detection scan operation, and obtaining link quality indications (LQIs) for the selected channels by periodically performing the active scan operation; (c') when the sensor node moves to a neighboring wireless sensor network, obtaining, at the sensor node, the energy values of the selected channels and the link quality indications (LQIs) for the channels by periodically performing energy detection scan and active scan operations; and (d') comparing, at the sensor node, the energy values and link quality indications (LQIs) for the selected channels before and after movement, and then forming an association with the parent node of the wireless sensor network before movement or a parent node of the wireless sensor network after movement according to the result of the comparison.

After step (d'), the method may further comprise the step of breaking off the association with the parent node of the wireless sensor network prior to change.

The sensor node may provide information about the wireless sensor network before movement to the parent node of the wireless sensor network after movement and vice versa.

Yet another aspect of the present invention provides a method for mobile sensor node roaming in an environment of a plurality of adjacent wireless sensor networks having a plurality of sensor nodes, the method comprising the steps of: obtaining, at the sensor node, energy values of channels and link quality indications (LQIs) of each channel which change with movement through periodic energy detection scan and active scan operations; and comparing and analyzing, at the sensor node, the energy values of the channels and the link quality indications (LQIs) of each channel that are obtained, and forming an association with a parent node of the wireless sensor network before and after the movement.

Energy scan values for each channel, IDs of a personal area network (PDN) node, and the link quality indications (LQIs) may be managed in a table.

BRIEF DESCRIPTION OF THE DRAWINGS

The above and other objects, features and advantages of the present invention will become more apparent to those of ordinary skill in the art by describing in detail exemplary embodiments thereof with reference to the attached drawings in which:

FIG. 5 is a diagram showing table information managed in the sensor nodes of FIG. 4.

DETAILED DESCRIPTION OF EXEMPLARY EMBODIMENTS

Hereinafter, an exemplary embodiment of the present invention will be described in detail. However, the present invention is not limited to the embodiment disclosed below, but can be implemented in various forms. The following embodiment is described in order to enable those of ordinary skill in the art to embody and practice the invention, and is not to be misconstrued as restricting the scope of the invention in any way.

Figure 1:
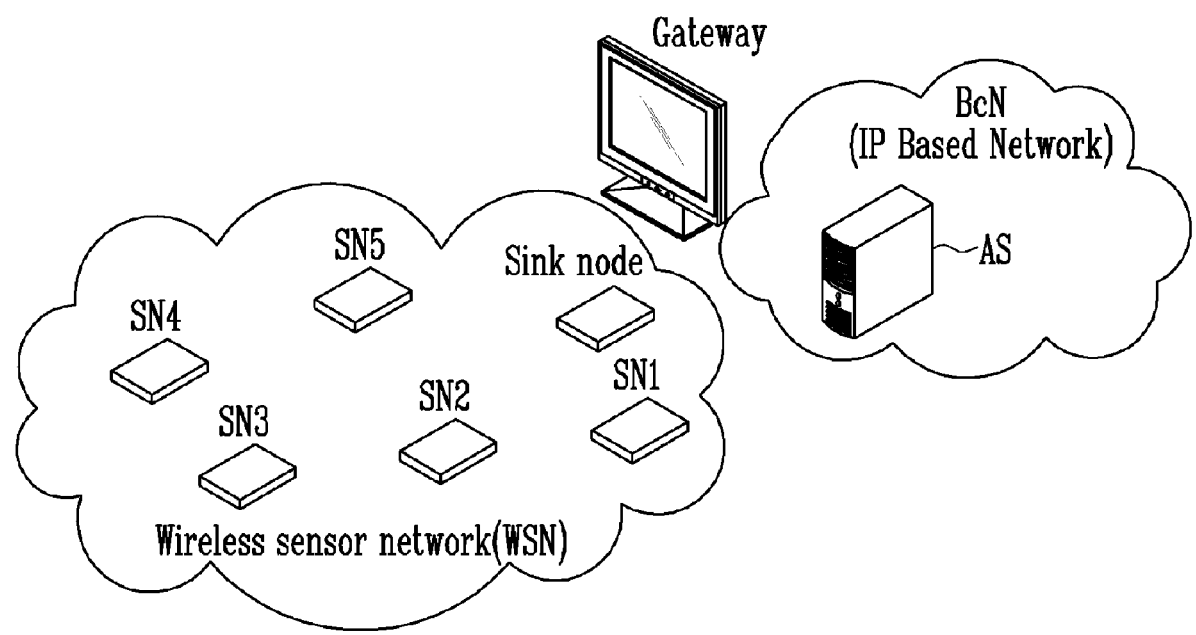
FIG. 1 is a conceptual diagram showing the configuration of a general wireless sensor network.
Figure 2:
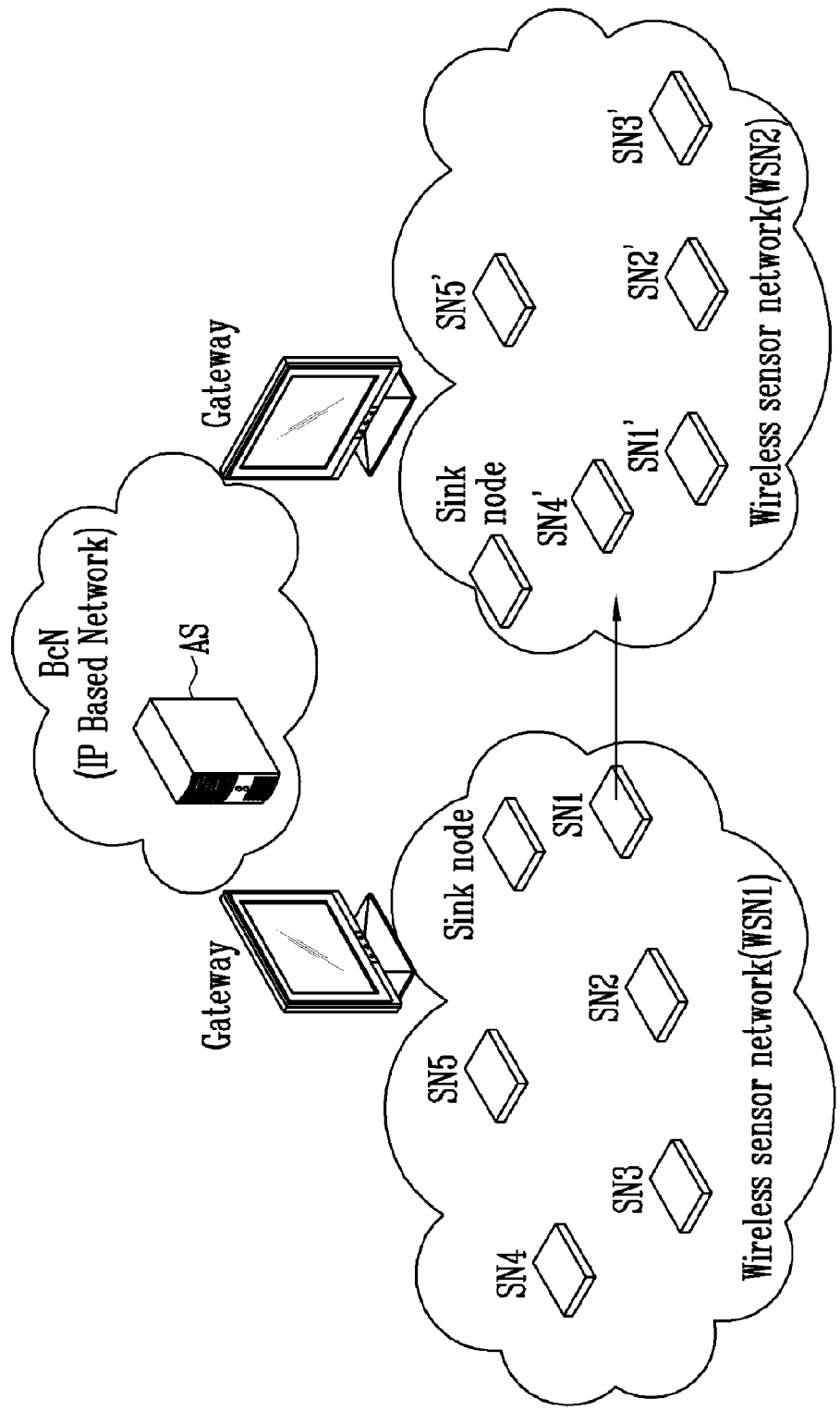
FIG. 2 is a diagram showing movement of a sensor node of FIG. 1 from a current wireless sensor network to a neighboring wireless sensor network.
Figure 3:
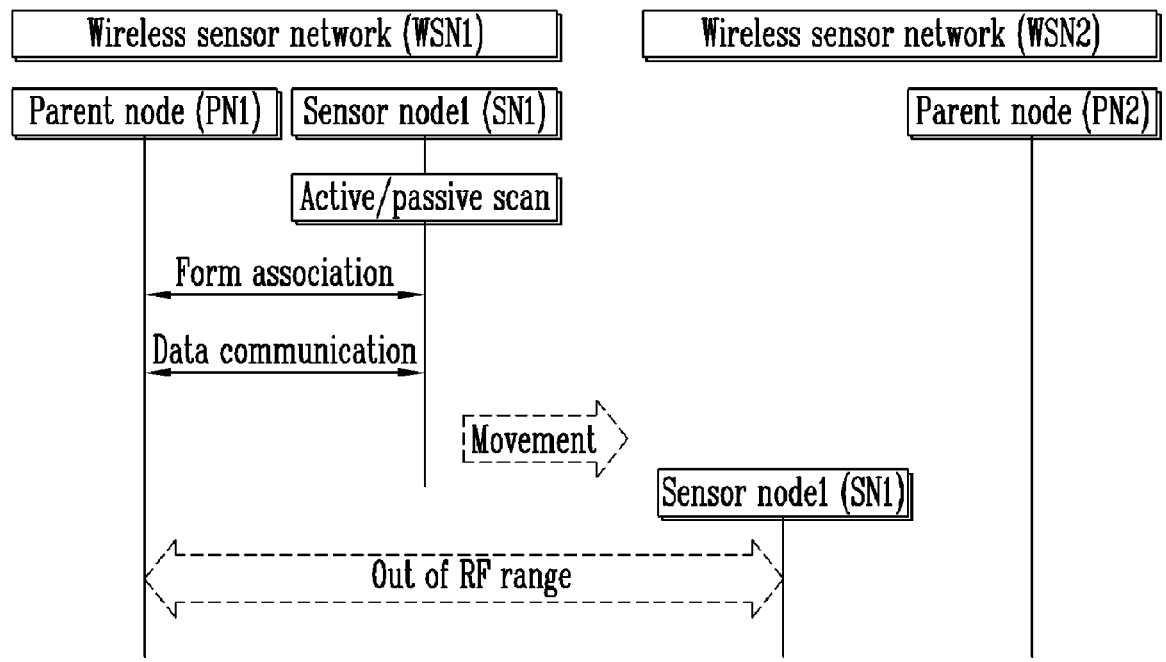
FIG. 3 is a flowchart showing movement of the sensor node of FIG. 2.
Figure 4:
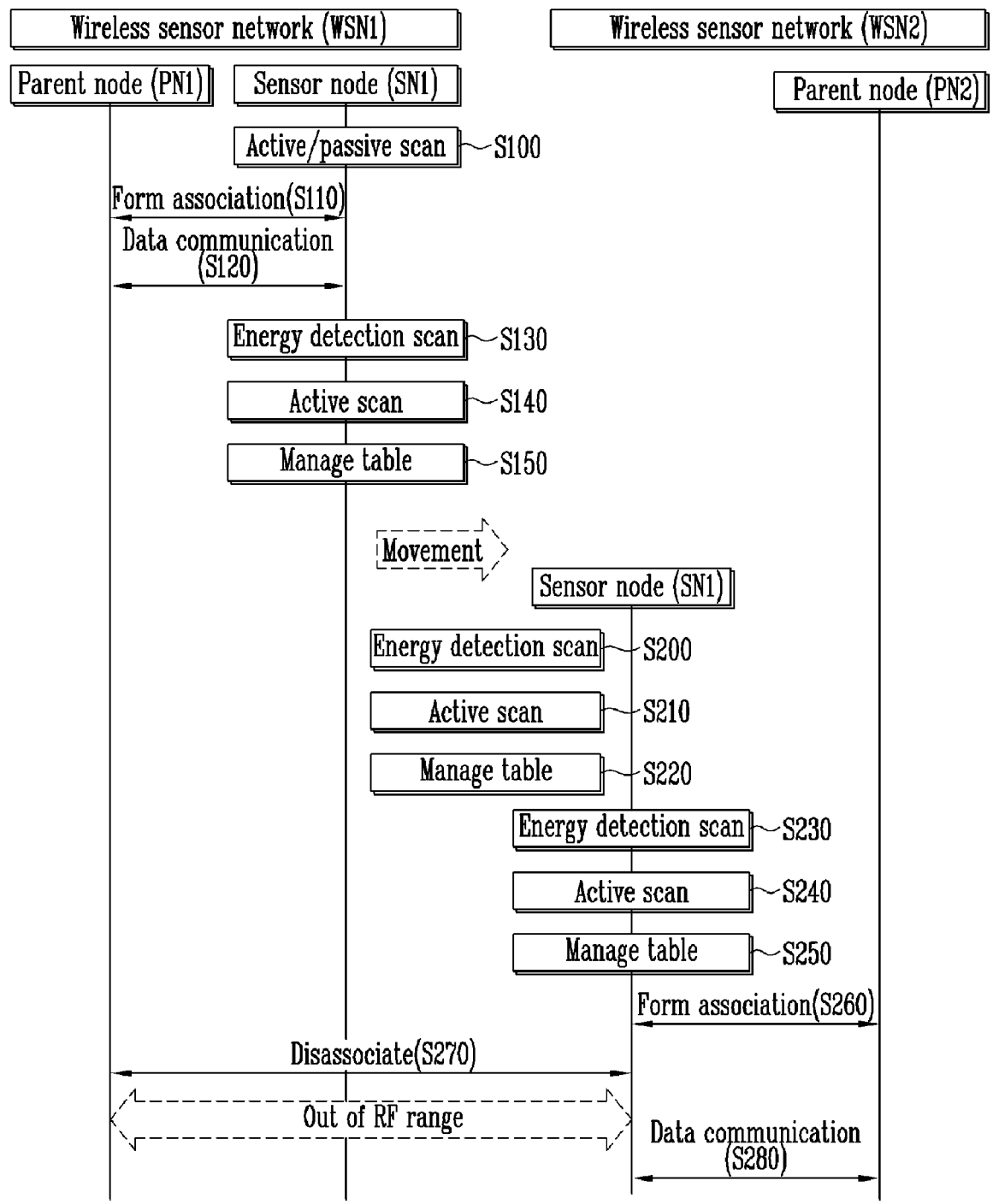
FIG. 4 is a flowchart showing a method for sensor node roaming in a wireless sensor network environment according to an embodiment of the present invention.

FIG. 4 is a flowchart showing a method for sensor node roaming in a wireless sensor network environment according to an embodiment of the present invention.

Referring to FIG. 4, a mobile sensor node SN1 performs an active or a passive scan operation in order to form an association with its parent node PN1 in a wireless sensor network WSN1 in which the sensor node is currently positioned. After it forms an association with the parent node PN1, data communication is performed in steps S100 to S120.

The active scan and the passive scan are well known in the field of the invention and will be briefly described below.

When performing the active scan, the sensor node sends out a probe signal for searching for a nearby access point. The access point receiving the probe signal responds with a response signal including several parameters required for connecting to the corresponding sensor node so that the sensor node can know whether there are connectable access points. When such an active scan is used, the sensor node can rapidly find the connectable access points, however, the power consumption of the sensor node is large.

Meanwhile, when performing the passive scan, the access points transmit a beacon signal to their circumstances once per several hundred ms and the sensor node receives the beacon signal so that it can know whether there are connectable access points. The beacon signal includes several parameters required for the sensor node to attempt connection to the wireless sensor network through the access point. In the passive scan, the power consumption of the sensor node is lower than in the active scan, however it takes more time to find access points.

Next, an energy detection scan is periodically performed, that is, the strength of an RF signal is periodically detected to select a currently used channel (S130), the active scan is periodically performed to collect the link quality indications (LQIs) for each channel (S140), and then the link quality indications (LQIs) for each channel are managed in a table (S150).

Also, even when the sensor node SN1 moves to a neighboring wireless sensor network WSN2, steps S200 to S220 are performed through the same processes as steps S130 to S150 so that energy values and link quality indications (LQIs) for the channel which change according to movement of the sensor node SN1 can be collected.

In other words, the energy values are detected by performing the periodic energy detection scan operation to select the currently used channel (S200), the active scan is periodically performed to collect the link quality indications (LQIs) for each channel (S210), and then the link quality indications (LQIs) for each channel are managed in a table (S220).

Next, when the mobile sensor node SN1 moves to the neighboring wireless sensor network WSN2, steps S230 to S250 are performed through the same processes as steps S200 to S220 so that the energy values and link quality indications (LQIs) for the channel which change according to movement of the sensor node SN1 can be collected.

In other words, the energy values are detected by performing the periodic energy detection scan operation to select moved channels (S230), and the active scan is periodically performed to collect link quality indications (LQIs) for each moved channel (S240), and then the link quality indications (LQIs) for each moved channel are managed in a table (S220).

Meanwhile, when more than two wireless sensor networks are sensed by means of the periodic energy detection scan and active scan operations, the work cycle is shortened from the moment it is determined that there are more than two wireless sensor networks. This makes it possible to effectively prevent the sensor node from becoming an orphan node.

Next, the sensor node SN1 compares the channel energy values and link quality indications (LQIs) collected before and after the change. If the channel energy values and link quality indications (LQI) are larger after the change than before, the sensor node SN1 forms an association with a parent node PN2 of a new wireless sensor network WSN2 (S260).

At this time, the sensor node SN1 can provide the information that it has roamed from wireless sensor network WSN1 to the parent node PN2 of the newly associated wireless sensor network WSN2.

Finally, the sensor node SN1 breaks off the association with the existing wireless sensor network WSN1 through a disassociation process with the parent node PN1 in WSN1 (S270), and then performs data communication with the parent node PN2 of the newly associated wireless sensor network WSN2 (S280).

At this time, the sensor node SN1 informs the existing parent node PN1 that it has moved to wireless sensor network WSN2. Thus, the existing wireless sensor network WSN1 is informed of where the sensor node SN1 has roamed to. Through such successive processes, the mobile sensor node SN1 can effectively roam from the wireless sensor network WSN1 to the adjacent wireless sensor network WSN2.

FIG. 5 is a diagram showing table information managed in the sensor nodes of FIG. 4.

Referring to FIG. 5, when the mobile sensor node SN1 of FIG. 4 is fixed or moving, table content managed while performing the energy detection scan and the active scan is illustrated.

The table managed by the mobile sensor node SN1 is provided with channel numbers for performing the energy scan. The channel numbers denote channels that can undergo the energy scan according to frequency, wherein the channel range is preferably set as 0 to 26.

Also, the table includes the energy scan values for each channel, the IDs of the personal area network (PAN) node in the channel, and the link quality indications (LQIs) according to each personal area network (PAN).

The link quality indication (LQI) is a value obtained from a received signal strength indication (RSSI) value, a signal to noise ratio (SNR), and an energy scan value, etc. Instead of the link quality indication (LQI), the received signal strength indication (RSSI) value, the signal to noise ratio (SNR), and the energy scan value, etc. can be managed in the table.

A method for sensor node roaming in a wireless sensor network environment of the present invention promotes the development of various wireless sensor network-based application services by performing effective sensor node roaming between adjacent wireless sensor networks.

While the invention has been shown and described with reference to an exemplary embodiment thereof, the present invention is not limited thereto. It will be understood by those skilled in the art that various changes in form and details may be made to the above-described embodiment without departing from the spirit and scope of the invention as defined by the appended claims.

What is claimed is:

1. A method for mobile sensor node roaming in an environment of first and second adjacent wireless sensor networks having a plurality of sensor nodes, the method comprising the steps of:
   (a) periodically performing energy detection scan and active scan operations, at the mobile sensor node forming an association with a parent node of the first wireless network, and obtaining energy values of selected channels and link quality indications (LQIs) for the channels;
   (b) when the sensor node moves to the second wireless sensor network, periodically performing energy detection scan and active scan operations, at the sensor node, and obtaining energy values of selected channels and link quality indications (LQIs) for the channels after movement;
   (c) comparing, at the sensor node, the energy values and link quality indications (LQIs) of the selected channels before and after movement;
   (d) when the selected channel energy values and link quality indications (LQIs) are larger after movement than before movement, forming, at the sensor node, an association with a parent node of the second wireless sensor network; and
   (e) breaking off, at the sensor node, the association with the parent node of the first wireless sensor network.

2. The method of claim 1, wherein in steps (a) and (b), the energy values and link quality indications (LQIs) for each channel are managed in a table.

3. The method of claim 2, wherein the table further comprises energy scan values for each channel and IDs of personal area network (PAN) nodes in each channel.

4. The method of claim 2, wherein the link quality indications (LQIs) for each channel are obtained from a received signal strength indication (RSSI) value, a signal to noise ratio (SNR), and an energy scan value.

5. The method of claim 1, wherein in step (d), the sensor node provides information about the first wireless sensor network, in which it has already formed an association, to the parent node of the second wireless sensor network.

6. The method of claim 1, wherein in step (e), the sensor node provides the information about the second wireless sensor network, to which it moved, to the parent node of the first wireless sensor network.

7. A method for mobile sensor node roaming in an environment of a plurality of adjacent wireless sensor networks having a plurality of sensor nodes, the method comprising the steps of:
   (a') forming, at the sensor node, an association with a parent node of a wireless sensor network in which the sensor node is currently positioned through a periodic active scan operation;
   (b') selecting, at the sensor node, currently used channels by detecting energy values through a periodic energy detection scan operation, and obtaining link quality indications (LQIs) for the selected channels by periodically performing the active scan operation;
   (c') when the sensor node moves to a neighboring wireless sensor network, obtaining, at the sensor node, the energy values of the selected channels and the link quality indications (LQIs) for the channels by periodically performing energy detection scan and active scan operations; and
   (d') comparing, at the sensor node, the energy values and link quality indications (LQIs) for the selected channels before and after movement, and then forming an association with the parent node of the wireless sensor network before movement or a parent node of the wireless sensor network after movement according to the result of the comparison.

8. The method of claim 7, after step (d'), further comprising the step of breaking off the association with the parent node of the wireless sensor network prior to change.

9. The method of claim 7, wherein the sensor node provides information on the wireless sensor network before movement to the parent node of the wireless sensor network after movement and vice versa.

* * * * *